United States Patent
Maloney et al.

(10) Patent No.: US 11,959,032 B2
(45) Date of Patent: Apr. 16, 2024

(54) PROCESS FOR MIXING DILUTION STEAM WITH LIQUID HYDROCARBONS BEFORE STEAM CRACKING

(71) Applicants: LUMMUS TECHNOLOGY LLC, Houston, TX (US); Saudi Aramco Technologies Company, Dhahran (SA)

(72) Inventors: Dennis Maloney, Houston, TX (US); Kandasamy Sundaram, Houston, TX (US); Raghu Narayan, Houston, TX (US); Abdul Rahman Zafer Akhras, Houston, TX (US)

(73) Assignees: LUMMUS TECHNOLOGY LLC, Houston, TX (US); Saudi Arabian Technology Company, Dhahran (SA)

( * ) Notice: Subject to any disclaimer, the term of this patent is extended or adjusted under 35 U.S.C. 154(b) by 0 days.

(21) Appl. No.: 17/810,487

(22) Filed: Jul. 1, 2022

(65) Prior Publication Data

US 2022/0333025 A1    Oct. 20, 2022

Related U.S. Application Data

(62) Division of application No. 16/819,930, filed on Mar. 16, 2020, now Pat. No. 11,407,950.

(Continued)

(51) Int. Cl.
*C10G 69/06* (2006.01)
*B01J 19/24* (2006.01)
(Continued)

(52) U.S. Cl.
CPC ............ *C10G 69/06* (2013.01); *B01J 19/245* (2013.01); *C10G 9/36* (2013.01); *C10G 21/003* (2013.01);

(Continued)

(58) Field of Classification Search
CPC ........ C10G 45/00; C10G 45/26; C10G 45/32; C10G 45/44; C10G 1/006; C10G 2400/20;
(Continued)

(56) References Cited

U.S. PATENT DOCUMENTS 3,617,493 A    11/1971    Wirth et al.
4,498,629 A     2/1985    Grondman
(Continued)

FOREIGN PATENT DOCUMENTS

CN           103937545 A      7/2014
KR       10-2017-0067794 A    6/2017
(Continued)

OTHER PUBLICATIONS

Office Action issued in Russian Application No. 20211299898, dated Jul. 25, 2022 (25 pages).
(Continued)

*Primary Examiner* — Prem C Singh
*Assistant Examiner* — Brandi M Doyle
(74) *Attorney, Agent, or Firm* — Osha Bergman Watanabe & Burton LLP

(57) ABSTRACT

A process for steam cracking a whole crude including a volatilization step performed to maintain a relatively large hydrocarbon droplet size. The process may include contacting a whole crude with steam to volatilize a portion of the hydrocarbons, wherein the contacting of the hydrocarbon feedstock and steam is conducted at an initial relative velocity of less than 30 m/s, for example. The resulting vapor phase, including volatilized hydrocarbons and steam may then be separated from a liquid phase comprising unvaporized hydrocarbons. The hydrocarbons in the vapor phase may then be forwarded to a steam pyrolysis reactor for steam cracking of the hydrocarbons in the vapor phase.

10 Claims, 1 Drawing Sheet

Related U.S. Application Data

(60) Provisional application No. 62/819,282, filed on Mar. 15, 2019, provisional application No. 62/819,315, filed on Mar. 15, 2019, provisional application No. 62/819,270, filed on Mar. 15, 2019, provisional application No. 62/819,247, filed on Mar. 15, 2019, provisional application No. 62/819,229, filed on Mar. 15, 2019.

(51) Int. Cl.
| | |
|---|---|
| *C10G 9/36* | (2006.01) |
| *C10G 21/00* | (2006.01) |
| *C10G 45/26* | (2006.01) |
| *C10G 45/32* | (2006.01) |
| *C10G 45/44* | (2006.01) |
| *C10G 47/26* | (2006.01) |
| *C10G 47/30* | (2006.01) |
| *C10G 49/02* | (2006.01) |
| *C10G 49/22* | (2006.01) |
| *C10G 55/04* | (2006.01) |
| *C10G 65/12* | (2006.01) |
| *C10L 1/08* | (2006.01) |
| *B01D 3/06* | (2006.01) |
| *B01D 19/00* | (2006.01) |

(52) U.S. Cl.
CPC ............ *C10G 45/26* (2013.01); *C10G 45/32* (2013.01); *C10G 45/44* (2013.01); *C10G 47/26* (2013.01); *C10G 47/30* (2013.01); *C10G 49/02* (2013.01); *C10G 49/22* (2013.01); *C10G 55/04* (2013.01); *C10G 65/12* (2013.01); *C10L 1/08* (2013.01); *B01D 3/06* (2013.01); *B01D 19/0057* (2013.01); *B01J 2219/0004* (2013.01); *C10G 2300/1044* (2013.01); *C10G 2300/1048* (2013.01); *C10G 2300/202* (2013.01); *C10G 2300/205* (2013.01); *C10G 2300/206* (2013.01); *C10G 2300/301* (2013.01); *C10G 2300/302* (2013.01); *C10G 2300/308* (2013.01); *C10G 2300/40* (2013.01); *C10G 2300/4006* (2013.01); *C10G 2300/4081* (2013.01); *C10G 2300/807* (2013.01); *C10G 2400/20* (2013.01); *C10G 2400/22* (2013.01); *C10G 2400/30* (2013.01)

(58) Field of Classification Search
CPC ............ C10G 2400/22; C10G 2400/30; C10G 2400/4006; C10G 2300/1044; C10G 2300/1048; C10G 2300/202; C10G 2300/205; C10G 2300/206; C10G 2300/301; C10G 2300/302; C10G 2300/308; C10G 2300/40; C10G 2300/4081; C10G 2300/807; C10G 47/00; C10G 47/26; C10G 47/30; C10G 9/16; C10G 9/36; C10G 69/06; C10G 69/14; C10G 49/22; C10G 49/02; C10G 65/02; C10G 65/12; C10G 21/003; C10G 55/04; C10L 1/08; B01J 2219/0004; B01J 19/245; B01D 19/0057; B01D 3/06
See application file for complete search history.

(56) References Cited

U.S. PATENT DOCUMENTS

| | | |
|---|---|---|
| 7,097,758 B2 | 8/2006 | Stell et al. |
| 7,279,610 B2 | 10/2007 | Cruijsberg et al. |
| 8,070,938 B2 | 12/2011 | Stein et al. |
| 2009/0050530 A1 | 2/2009 | Spicer et al. |

FOREIGN PATENT DOCUMENTS

| | | |
|---|---|---|
| KZ | 24302 B | 7/2011 |
| RU | 2177843 C2 | 1/2002 |
| RU | 2640592 C2 | 1/2018 |
| RU | 2673545 C2 | 11/2018 |
| TW | 1265195 B | 11/2006 |
| WO | 2018142351 A1 | 8/2018 |

OTHER PUBLICATIONS

Office Action issued in Russian Application No. 2021129898, dated May 5, 2023 (18 pages).
Search Report issued in Taiwanese Application No. 109108651 mailed on Nov. 7, 2023 (8 pages).
Office Action issued in Korean Application No. 10-2021-7033154 mailed on Nov. 2, 2023 (13 pages).

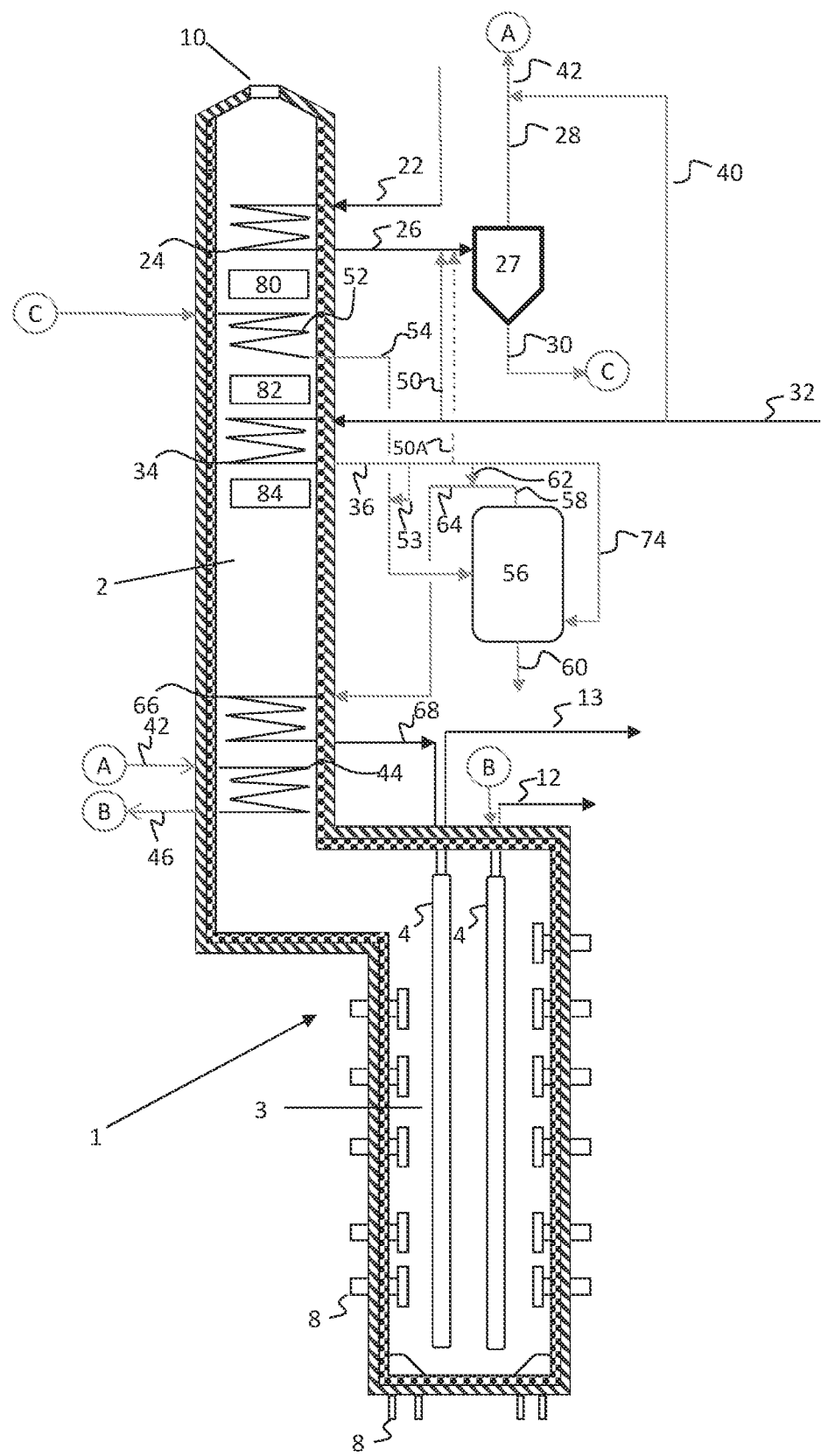

PROCESS FOR MIXING DILUTION STEAM WITH LIQUID HYDROCARBONS BEFORE STEAM CRACKING

CROSS-REFERENCE TO RELATED APPLICATIONS

This application, pursuant to 35 U.S.C. § 119(e), claims priority to U.S. Provisional Application Ser. Nos. 62/819,270, 62/819,282, 62/819,247, 62/819,229, and 62/819,315, each filed Mar. 15, 2019, and each of which is herein incorporated by reference in its entirety.

FIELD OF THE DISCLOSURE

Embodiments disclosed herein relate generally to the processing of hydrocarbon mixtures, such as whole crudes or other hydrocarbon mixtures including non-volatile hydrocarbons, to produce olefins.

BACKGROUND

Hydrocarbon mixtures having non-volatile components, such as those having an end boiling point over 550° C., are generally not processed directly in a steam pyrolysis reactor to produce olefins, as the reactor cokes fairly rapidly. While limiting reaction conditions may reduce the fouling tendency, the less severe conditions result in a significant loss in yield.

The general consensus in the art is that hydrocarbon mixtures having a wide boiling range and/or hydrocarbons having a high end boiling point require an initial separation of the hydrocarbons into numerous fractions, such as gas/light hydrocarbons, naphtha range hydrocarbons, gas oil, etc., and then cracking each fraction under conditions specific for those fractions, such as in separate steam pyrolysis furnaces. While the fractionation, such as via a distillation column, and separate processing may be capital and energy intensive, it is generally believed that the separate and individual processing of the fractions provides the highest benefit with respect to process control and yield.

For heavy hydrocarbon processing and other steam cracking processes requiring contacting of a hydrocarbon fraction with dilution steam, various prior art documents teach partial vaporization of the liquid hydrocarbon feedstocks before mixing with dilution steam in the weight ratio of 0.5 to 1.0 (steam to hydrocarbons). For traditional feedstocks, the mixing is done at high velocities and results in total vaporization of the feedstock. However, for feeds containing non-volatile hydrocarbons, such as whole crudes, total vaporization is not achieved nor desired.

The steam and hydrocarbons, during these mixing and volatilization processes, are typically contacted at relative velocities (steam velocity minus hydrocarbon velocity) often as high as or higher than 100 m/s. These contact velocities result in formation of small liquid droplets, desirably induced to intimately contact the hydrocarbons and the steam to achieve a high level of vaporization. Unfortunately, these small liquid droplets are difficult to remove from the vapor. As a result, there is a need for extraordinary vapor-liquid separators, such as a Heavy Oil Processing System (HOPS), to remove these small droplets before the separated vapor is sent to the radiant section of the steam cracker.

Various prior art documents may include U.S. Pat. Nos. 3,617,493, 4,498,629, 6,632,351, 7,097,758, 8,070,938, as well as Ludwig Kniel et al, "Ethylene: Keystone to the Petrochemical Industry," Marcel Dekker, Inc., New York, 1980, p. 85, and Mal J. Maddock, Ph.D., "Improved Field Condensate Cracking Trends in Industrial Application," Paper presented at Refining, LNG and Petrochem Asia 92, Dec. 1-4, 1992, Singapore.

SUMMARY OF THE DISCLOSURE

Processes have now been developed for flexibly processing whole crudes and other hydrocarbon mixtures containing non-volatile hydrocarbons and/or high boiling coke precursors, at chosen operating conditions. More specifically, liquid hydrocarbon feeds may be preheated, according to embodiments herein, without forming significant vapor, while avoiding high relative velocities. Dilution steam is added to the hydrocarbon at a low relative velocity to vaporize the more volatile hydrocarbons, without creating small, difficult to separate, liquid droplets. Embodiments herein may advantageously reduce coking and fouling during the further processing, such as thermal cracking, even at high severity conditions, to attain desirable yields while significantly decreasing the capital and energy requirements associated with pre-fractionation and separate processing.

In one aspect, embodiments disclosed herein relate to a process for steam cracking a whole crude. The process may include contacting a whole crude with steam to volatilize a portion of the hydrocarbons therein. The contacting of the hydrocarbon feedstock and steam may be conducted at an initial relative velocity of less than 30 m/s. The process may also include separating a vapor phase comprising volatilized hydrocarbons and steam from a liquid phase comprising unvaporized hydrocarbons and steam cracking hydrocarbons in the vapor phase.

In some embodiments, the contacting of the whole crude and steam may be conducted at an initial relative velocity in the range from about 1 m/s to about 15 m/s. In other embodiments, the contacting of the whole crude and steam may be conducted at an initial relative velocity in the range from about 2 m/s to about 10 m/s.

The contacting of the steam and hydrocarbons may further include forming hydrocarbon droplets having a drop size distribution with a D50 of greater than about 1000 microns in some embodiments, where 50 weight percent of the liquid is contained in droplets with diameters smaller than D50. In various embodiments, the process may include forming hydrocarbon droplets having a D10 of greater than about 20 microns, where 10 weight percent of the liquid is contained in droplets with diameters smaller than D1 and 90 weight percent of the liquid is contained in droplets with diameters larger than D10. Embodiments herein may also include preheating the whole crude to a temperature below its bubble point temperature prior to the contacting step.

In some embodiments, the contacting may include mixing the steam and the whole crude in co-current flow, and the separating may include separating the vapor phase from the liquid phase in a cyclonic separator. In other embodiments, the steam and the whole crude may be contacted counter-currently.

The process may include controlling a steam temperature and steam feed rate sufficient to volatilize 5 to 90 weight percent of hydrocarbons in the whole crude, in some embodiments, for example. In other embodiments, the process may include controlling a steam temperature and steam feed rate sufficient to volatilize 10 to 30 weight percent of hydrocarbons in the whole crude.

In another aspect, embodiments disclosed herein relate to a process for steam cracking a whole crude or a portion thereof to produce olefins and/or aromatics. The process may include contacting a whole crude with steam to volatilize a portion of the hydrocarbons. The contacting of the whole crude and steam may be conducted such that hydrocarbon droplets having a D10 of greater than about 15 microns are formed. The process may also include recovering a vapor phase including volatilized hydrocarbons and steam and a liquid phase including unvaporized hydrocarbons. The vapor phase may then be fed to a steam pyrolysis reactor to convert at least a portion of the hydrocarbons therein to olefins and/or aromatics.

In some embodiments, the contacting of the whole crude forms hydrocarbon droplets having a D10 of greater than about 20 microns. In various embodiments, the contacting of the whole crude forms hydrocarbon droplets having a D10 of greater than about 25 microns.

In some embodiments, the process may include passing the whole crude through a convection section of the steam pyrolysis reactor for preheating the whole crude prior to the contacting step. The preheating may include, for example, heating the whole crude to a temperature below its bubble point temperature.

The process may further include controlling a steam temperature and steam feed rate sufficient to volatilize 5 to 90 weight percent of the hydrocarbons in the hydrocarbon feedstock. In other embodiments, the steam temperature and flow rate may be controlled to volatilize 10 to 30 weight percent of the hydrocarbons in the hydrocarbon feedstock. In yet other embodiments, the process may include controlling the steam temperature and steam flow rate to recover in the vapor fraction 70 to 98 weight percent of hydrocarbons in the whole crude having a normal boiling point of 160° C. or less.

In another aspect, embodiments disclosed herein relate to a system for producing olefins from a wide boiling range hydrocarbon feedstock. The system may include a volatilization device having a steam inlet, a hydrocarbon inlet, a vapor phase outlet and a liquid phase outlet. A control system may be provided and configured to maintain a flow rate of the hydrocarbon feedstock, introduced via the hydrocarbon inlet, and steam, introduced via the steam inlet, at a relative contact velocity of less than 30 m/s, for example. The system may also include a steam pyrolysis reactor for converting volatilized hydrocarbons recovered via the vapor phase outlet to form olefins and aromatics.

In some embodiments, for example, the control system may be configured to maintain a flow rate of the hydrocarbon feedstock, introduced via the hydrocarbon inlet, and steam, introduced via the steam inlet, at a relative contact velocity of less than 15 m/s.

The volatilization device may include the steam inlet and the hydrocarbon inlet configured as concentric pipes arranged in a co-current flow configuration in some embodiments. The volatilization device may further include a cyclonic separator configured for receiving the co-current flowing steam and hydrocarbon from the concentric inlets. In other embodiments, the volatilization device may be configured with the steam inlet and hydrocarbon inlet arranged in a counter-current flow configuration.

In another aspect, embodiments disclosed herein relate to a process for steam cracking a wide boiling range hydrocarbon feedstock. The process may include contacting a wide boiling range hydrocarbon feedstock, which may include raw or previously processed or hydroprocessed streams, with steam, to volatilize a portion of the hydrocarbons. The contacting of the hydrocarbon feedstock and steam may be conducted at an initial relative velocity of less than 30 m/s. The process may further include separating a vapor phase including volatilized hydrocarbons and steam from a liquid phase including unvaporized hydrocarbons, as well as steam cracking hydrocarbons in the vapor phase.

In each of the above embodiments, where steam is to be admixed with a liquid hydrocarbon stream, such contacting is done at low velocity to vaporize the more volatile hydrocarbons without creating small, difficult to separate, liquid droplets.

The process flow diagram shown in the attached sketch may be slightly modified for specific crudes and product slates. Other aspects and advantages will be apparent from the following description and the appended claims.

BRIEF DESCRIPTION OF DRAWINGS

The FIGURE is a simplified process flow diagram of a system for thermally cracking hydrocarbon mixtures according to embodiments herein.

DETAILED DESCRIPTION

In one aspect, embodiments disclosed herein relate to systems and processes for the controlled volatilization of a wide boiling range hydrocarbon feedstock with steam. As noted above, when the end boiling point of a hydrocarbon mixture is high, such as over 550° C., the hydrocarbon mixture may contain undesirable or hard-to-process compounds. For example, high boiling components cannot be processed directly in a steam pyrolysis reactor to produce olefins, as the presence of these heavy hydrocarbons results in the formation of coke in the reactor, where the coking may occur in one or more of the convection zone preheating coils or superheating coils, in the radiant coils, or in transfer line exchangers, and where such coking may occur rapidly, such as in a few hours.

When volatilizing the hydrocarbons for separation and feed to downstream processes, it has been found that "gentle" contact of the steam with the hydrocarbons may advantageously vaporize the lighter hydrocarbons in the mixture while minimizing or avoiding droplet formation and entrainment of heavier hydrocarbons that may interfere with the downstream processing. As used herein, "gentle" may refer to contacting of the hydrocarbon and steam conducted, for example, at an initial relative velocity of less than 30 m/s to produce a separable mixture including a liquid phase comprising unvaporized hydrocarbons and a vapor phase comprising volatilized hydrocarbons and steam. In some embodiments, the contacting of the hydrocarbon feedstock and steam may be conducted at an initial relative velocity in the range from about 1 m/s to about 30 m/s m/s, such as in the range from about 1 m/s to about 15 m/s. In other embodiments, the contacting of the hydrocarbon feedstock and steam may be conducted at an initial relative velocity in the range from about 2 m/s to about 10 m/s, such as in the range from about 3.5 m/s to about 10 m/s or from about 6.5 m/s to about 9.5 m/s. The initial contacting of the steam and the hydrocarbons may occur, for example, at relative velocities of less than 30 m/s, less than 25 m/s, less than 20 m/s, less than 18 m/s, less than 15 m/s, less than 12 m/s or less than 10 m/s, such as at a relative velocity in the range from a lower limit of 1, 2, 3, 4, 5, 6, 7, 8, 9, or 10 m/s to an upper limit of 5, 6, 7, 8, 9, 10, 12, 15, 18, 20, or 25 m/s, where any lower limit may be combined with any upper limit. As used herein, the initial relative velocity refers to the differences in the velocities of the respective streams when initially mixed.

The amount of hydrocarbons desired to be volatilized may impact the lower limit for the velocity. An amount of heat is available within a specific volume of steam at a given temperature difference with the hydrocarbons. As such, the velocity of the steam, which is determined by the flow area and volumetric flow rate of the steam, should be sufficient enough to volatilize a desired amount of hydrocarbons in the hydrocarbon feedstock. Accordingly, the sizing of the components used for contacting of the steam and hydrocarbons may be determined based on their respective flow rates needed to achieve a desirable amount of volatilization.

In some embodiments, the hydrocarbon feedstock may be preheated to a temperature below, at, or above its bubble point temperature with some vapor prior to contacting the hydrocarbon feedstock with the steam. The preheating may occur, for example, in a heat exchanger, such as a feed/effluent heat exchanger, as well as in heating coils disposed, for example, in a convective section of a heater.

Contacting of the steam and the hydrocarbon feedstock may be conducted, in some embodiments, with the steam and hydrocarbons in co-current flow. For example, the steam and hydrocarbons may be mixed via concentric pipes, where the steam or hydrocarbons flowing in the outer pipe may contact the other of the steam or hydrocarbons flowing at a terminus of an inner pipe. In some embodiments, the steam may be in the outer pipe, and the hydrocarbons may be flowing in the inner pipe. In other embodiments, the hydrocarbon may be flowing in the outer pipe, and the steam may be flowing in the inner pipe. In some embodiments, mixing devices, such as a static mixer, may be provided downstream of the terminus of the inner pipe.

Following admixture, direct heating may result in partial volatilization of the hydrocarbons. The resulting two-phase mixture may be fed to a separator for separation of the liquid phase, including non-volatilized hydrocarbons, from a vapor phase, including the steam and the volatilized hydrocarbons. Because the steam and hydrocarbons are mixed in a gentle fashion, minimal or no droplets may be formed that may entrain heavier hydrocarbons to the vapor phase outlet. Accordingly, co-current contacting of the steam and hydrocarbons may allow for the low relative velocity, such as less than 30 m/s or less than 15 m/s, and may allow for the liquid hydrocarbon droplet diameter to be predominantly above 25 microns, for example. Such liquid hydrocarbon droplet diameter may allow vaporization of light components without vaporizing or entraining heavy components.

In some embodiments, the separator may be a flash vessel. In some embodiments, the mixture of steam and hydrocarbons, following contact, may be fed to a cylindrical flash vessel such that the bulk of the flow is introduced tangentially into the vessel, creating a cyclonic flow, thereby facilitating separation of the vapor and liquid phases, including any droplets that may have been formed during the mixing process. The cyclonic separation chamber may include an upper outlet for recovering the vapor phase and a lower outlet for recovering the liquid phase.

In other embodiments, the steam and hydrocarbon feedstock may be contacted counter-currently. For example, the steam and the hydrocarbons may be introduced at opposite ends of a vertical vessel, where the down falling hydrocarbons may be contacted with the up-flowing steam. In some embodiments, the vertical vessel may contain mass/heat transfer internals and/or distributors for introducing the steam and/or hydrocarbons. The velocities in the vertical vessel may be maintained low enough to prevent significant formation of small liquid droplets (i.e., droplets with diameters less than 25 microns), but high enough to attain a desired degree of volatilization of light components.

As described above, both co-current and counter-current contacting of steam and hydrocarbons according to embodiments herein may be conducted at relative velocities so as to avoid formation of significant quantities of small hydrocarbon droplets that may be entrained. However, it is recognized that the contacting will result in a droplet size distribution. In some embodiments, contacting of steam and hydrocarbons according to embodiments herein may be conducted at relative velocities such that the droplets formed have an a D50 that is greater than 100 microns, greater than 150 microns, greater than 200 microns, greater than 250 microns, greater than 300 microns, or greater than 350 microns. In other embodiments, the droplets formed have a D10 that is greater than 5 microns, such as greater than 10 microns, greater than 15 microns, greater than 20 microns, greater than 25 microns, greater than 30 microns, greater than 35 microns, greater than 85 microns, or greater than 200 microns. In some embodiments, the droplets formed may have a D10 in the range from about 60 to about 150 microns and a D50 in the range from about 200 to about 350 microns. In other embodiments, contact of the steam and hydrocarbon may be conducted such that less than 5%, less than 10%, or less than 15% of the droplets have a diameter of less than 25 microns.

The above-described volatilization of a wide-boiling range hydrocarbon feedstock may be advantageously applied to a system for thermally cracking hydrocarbons to produce olefins and/or aromatics. Hydrocarbon mixtures useful in embodiments disclosed herein may include various hydrocarbon mixtures, including those having a boiling range, where the end boiling point of the mixture may be greater than 450° C. or greater than 500° C., such as greater than 525° C., 550° C., or 575° C. The amount of high boiling hydrocarbons, such as hydrocarbons boiling over 550° C., may be as little as 0.1 wt %, 1 wt % or 2 wt %, but can be as high as 10 wt %, 25 wt %, 50 wt % or greater. Embodiments herein may be described with respect to crude oils, but any high boiling end point hydrocarbon mixture, such as crudes and condensates, can be used. Processes disclosed herein can be applied to crudes, condensates and hydrocarbon with a wide boiling curve and end points higher than 500° C. or feeds that contain trace quantities of contaminants with an end boiling point as low as 150° C. Such hydrocarbon mixtures may include whole crudes, virgin crudes, hydroprocessed crudes, gas oils, vacuum gas oils, heating oils, jet fuels, diesels, kerosenes, gasolines, synthetic naphthas, raffinate reformates, Fischer-Tropsch liquids, Fischer-Tropsch gases, natural gasolines, distillates, virgin naphthas, natural gas condensates, atmospheric pipestill bottoms, vacuum pipestill streams including bottoms, wide boiling range naphtha to gas oil condensates, heavy non-virgin hydrocarbon streams from refineries, vacuum gas oils, heavy gas oils, atmospheric residuum, hydrocracker wax, and Fischer-Tropsch wax, among others. In some embodiments, the hydrocarbon mixture may include hydrocarbons boiling from the naphtha range or lighter to the vacuum gas oil range or heavier. If desired, these feeds may be pre-processed to remove a portion of the sulfur, nitrogen, metals, and Conradson Carbon upstream of processes disclosed herein or hydroprocessed to increase hydrogen content or reduce molecular weight.

When the end boiling point of the hydrocarbon mixture is high, such as over 550° C., the hydrocarbon mixture cannot be processed directly in a steam pyrolysis reactor to produce olefins. The presence of these heavy hydrocarbons results in the formation of coke in the reactor, where the coking may occur in one or more of the convection zone preheating coils or superheating coils, in the radiant coils, or in transfer line exchangers, and such coking may occur rapidly, such as in few hours. Whole crude is not cracked commercially, as it is not economical. It is generally fractionated, and only specific cuts are used in a steam pyrolysis reactor to produce olefins. The remainder is used in other processes. Contaminated feeds with lower end points may also affect the olefin plants in the steam pyrolysis reactor or in the product recovery section, or both.

The cracking reaction proceeds via a free radical mechanism. Hence, high ethylene yield can be achieved when it is cracked at high temperatures. Lighter feeds, like butanes and pentanes, require a high reactor temperature to obtain high olefin yields. Heavy feeds, like gas oil and vacuum gas oil (VGO), require lower temperatures. Crude contains a distribution of compounds from butanes to VGO and residue (material having a normal boiling point over 550° C.). Subjecting the whole crude, without separation, to high temperatures produces a high yield of coke (byproduct of cracking hydrocarbons at high severity) and plugs the reactor. The steam pyrolysis reactor has to be periodically shut down and the coke removed by steam/air decoking. The time between two cleaning periods when the olefins are produced is called run length. When crude is cracked without separation, coke can deposit in the convection section coils (vaporizing the fluid), in the radiant section (where the olefin producing reactions occur) and/or in the transfer line exchanger (where the reactions are stopped quickly by cooling to preserve the olefin yields). Separation devices and processes herein may facilitate the fractionation of the whole crude into desired fractions for improved processing in the steam pyrolysis reactor.

When volatilizing the hydrocarbons for separation and feed to a steam cracker, it has been found that gentle contact of steam with the hydrocarbons may advantageously vaporize the lighter hydrocarbons in the mixture while minimizing or avoiding droplet formation and entrainment of heavier hydrocarbons. Embodiments disclosed herein may be used to preheat and separate the feed hydrocarbon mixture into two or more fractions. For example, embodiments herein may contact a whole crude with steam to volatilize a light hydrocarbon fraction, such as hydrocarbons having a normal boiling point temperature of less than 90° C., less than 120° C., less than 140° C., less than 150° C., less than 160° C., less than 180° C., less than 200° C., less than 220° C., less than 250° C., less than 300° C., less than 350° C., less than 400° C., or less than 450° C. Prior to contact with the steam, the hydrocarbon feedstock may be preheated, such as in a heat exchanger or by passing the feedstock through a convection section of a steam pyrolysis reactor (or a heater) to preheat the feed hydrocarbon mixture, facilitating separation into desired fractions.

Steam may be injected into the hydrocarbon feedstock at a low relative velocity (steam minus hydrocarbon velocity) to increase the vaporization of the hydrocarbon mixture and to control the heating and degree of separation achieved. The vaporization of the hydrocarbons may occur at relatively low temperatures. The initial contacting of the steam and the hydrocarbons may occur, for example, at low relative velocities, as described above, where the relative velocities may be, for example, less than 30 m/s, less than 25 m/s, less than 20 m/s, less than 15 m/s, less than 12 m/s, or less than 10 m/s.

In some embodiments, the steam temperature and steam feed rate may be sufficient to volatilize up to 5, up to 10, up to 15, up to 20, up to 25, up to 30, up to 35, or up to 40 weight percent of the hydrocarbons in the hydrocarbon feedstock, for example. In some embodiments, the steam temperature and steam flow rate may be sufficient to volatilize 70 to 90, 95, or even 98 weight percent of hydrocarbons having a normal boiling point of 160° C. or less, such as 75 to 85 weight percent of hydrocarbons having a normal boiling point of 160° C. or less. In other embodiments, the steam temperature and steam flow rate may be sufficient to volatilize 70 to 90, 95, or 98 weight percent of hydrocarbons having a normal boiling point of 200° C. or less, or 220° C. or less, such as 75 to 85 weight percent of hydrocarbons having a normal boiling point of 200° C. or 220° C. or less.

Contact of the steam and wide boiling range hydrocarbon according to embodiments herein may minimize or eliminate volatilization of coke precursors and/or entrainment of coke precursors. For example, for a given cut point temperature, embodiments herein may efficiently volatilize predominantly hydrocarbons having a normal boiling point equal to or less than the intended cut point temperature. For example, the hydrocarbon "cut" may be relatively clean, meaning the vaporized fraction may not have any substantial amount (>10 wt % as used herein) of compounds boiling above the intended boiling temperature target. For example, a 160° C.—cut may not have any substantial amount of hydrocarbon compounds boiling above 160° C. (i.e., >10 wt %). In other embodiments, the intended target "cut" temperatures may be a 95% boiling point temperature, or in other embodiments as an 85% boiling point temperature, such as may be measured using ASTM D86 or ASTM D2887, or a True Boiling Point (TBP) analysis according to ASTM D2892, for example. In such embodiments, there may be up to 5 wt %, up to 15 wt %, or up to 25 wt % of compounds above the indicated "cut" point temperature.

Processes for thermally cracking a wide boiling range hydrocarbon mixture, such as a whole crude, may thus include contacting a hydrocarbon feedstock having a boiling range up to 450° C. or greater with steam to volatilize a portion of the hydrocarbons. The contacting of the hydrocarbon feedstock and steam may be conducted at an initial relative velocity of less than 15 m/s or less than 12 m/s, such as at a relative velocity of 9 m/s, for example, as described above. Following recovery, the resulting vapor phase may be fed to a steam pyrolysis reactor to convert at least a portion of the hydrocarbons therein to olefins. The hydrocarbon feedstock may be passed through a convection section of the steam pyrolysis reactor for preheating the hydrocarbon feedstock prior to contact with the steam. In some embodiments, the preheating is conducted to limit the heating of the hydrocarbon feedstock to a temperature below its bubble point temperature.

In another aspect, embodiments herein relate to a system for volatilizing a wide boiling range hydrocarbon feedstock, and to systems for producing olefins and aromatics from a wide boiling range hydrocarbon feedstock. The systems herein may include a volatilization device including a steam inlet, a hydrocarbon inlet, a vapor phase outlet and a liquid phase outlet.

In some embodiments, the volatilization device comprises the steam inlet and hydrocarbon inlet configured as concentric pipes arranged in a co-current flow configuration. A co-current volatilization device may further include a cyclonic separator configured for receiving the co-current flowing steam and hydrocarbon from the concentric inlets. In other embodiments, the volatilization device may be configured with the steam inlet and hydrocarbon inlet arranged in a countercurrent flow configuration.

Systems herein may also include a control system to maintain a flow rate of the hydrocarbon feedstock, introduced via the hydrocarbon inlet, and a flow rate of the steam, introduced via the steam inlet. The control system may be configured to maintain the flow rates of the hydrocarbon feedstock and steam, and to control the contacting of the streams at a relative velocity of less than 30 m/s, less than 15 m/s, less than 12 m/s, less than 10 m/s, or at other relative velocities as described above.

The system may further include a steam pyrolysis reactor for converting volatilized hydrocarbons recovered via the vapor phase outlet to form olefins and aromatics.

The partial vaporization systems and methods described above may thus form a vapor-liquid mixture. The vaporous hydrocarbons may be separated from the liquid hydrocarbons, and only the vapors separated may be fed to radiant coils in one or more radiant cells of a steam pyrolysis reactor.

The heating and separation steps may be used to separate the hydrocarbon mixture into two or more hydrocarbon fractions, if desired. This may permit cracking of each cut optimally, such that the throughput, steam to oil ratios, heater inlet and outlet temperatures, and other variables may be controlled at desirable level to achieve the desired reaction results, such as to a desired product profile while limiting coking in the radiant coils and associated downstream equipment. The remaining liquid may be removed for further processing, such as conditioning of the heavier portions of the feedstock to convert the hard-to-process heavier components to hydrocarbons suitable for use as additional feeds to radiant coils for producing olefins and aromatics.

The hydrocarbon feedstock may be preheated with waste heat from process streams, including effluents from the cracking process or flue gas from the steam pyrolysis reactor/heater. Alternatively, crude heaters can be used for preheating. In such cases, to maximize thermal efficiency of the steam pyrolysis reactor, other cold fluids (like boiler feed water (BFW) or air preheat or economizer) can be employed as the uppermost cold sinks of the convection section.

The process of cracking hydrocarbons in a steam pyrolysis reactor may be divided into three parts, namely a convection section, a radiant section, and a quench section, such as in a transfer line exchanger (TLE). In the convection section, the feed is preheated, mixed with steam, and partially vaporized. In the radiant section, the feed is cracked (where the main cracking reaction takes place). In the TLE, the reacting fluid is quickly quenched to stop the reaction and control the product mixture. Instead of indirect quenching via heat exchange, direct quenching with oil is also acceptable.

Embodiments herein efficiently and selectively vaporize a hydrocarbon feedstock to limit or eliminate entrainment of heavier hydrocarbons, enhancing the cracking process. All heating may be performed in a convection section of a single reactor in some embodiments. In some embodiments, crude enters the top row of the convection bank and is preheated, with hot flue gas generated in the radiant section of the heater, at the operating pressure to medium temperatures without adding any steam. The outlet temperatures may vary from 150° C. to 230° C., depending upon the boiling range of the feedstock, pressure, and throughput. At these conditions, little to none of the hydrocarbons may be vaporized, maintaining the hydrocarbon feedstock below or at its bubble point. For example, the outlet temperature of this first heating step may be such that components as light as naphtha (having a normal boiling point of up to about 200° C.) are not vaporized or only minimally vaporized. Because the hydrocarbon mixture is preheated with hot flue gas generated in the radiant section of the heater, limited temperature variations and flexibility in the outlet temperature can be expected.

In some embodiments, a small quantity of steam may be added with the feed hydrocarbon and further preheated to achieve a temperature greater than 200° C., with partial vaporization of the feed. An addition of small amounts of steam may prevent coke formation and at the same time permits to heat the feed to high temperatures, enabling one to recover a higher yield of crude or raw feed for olefin and aromatics production.

The preheated hydrocarbon mixture may then be admixed with steam, as described above, at low relative velocities so as to only partially vaporize the hydrocarbon feedstock, and the vaporized portion may be separated from the unvaporized portion. The vapors may go to further superheating, mixed with dilution steam, and then fed to the radiant coil for cracking.

In some embodiments hydrocarbons having a normal boiling point of 160° C. or less may be volatilized, for example. This volatilized light hydrocarbon fraction and dilution steam mixture may be further superheated in the convection section and then enters the radiant coil. The radiant coil can be in a different cell, or a group of radiant coils in a single cell can be used to crack the light hydrocarbon fraction. The amount of dilution steam can be controlled to minimize the total energy. Typically, the steam to light hydrocarbon fraction is controlled at a steam to oil ratio of about 0.5 w/w, such as from 0.2 w/w to 1.0 w/w, or such as from about 0.3 w/w to about 0.7 w/w.

The unvaporized liquid hydrocarbons may, in some embodiments, be further processed or sent to fuel. If thermal cracking of the unvaporized liquid is desired to produce additional olefins and aromatics, the unvaporized liquid may be first conditioned in other refinery processes, such as an LC-FINING process or an LC-SLURRY process, available from Chevron Lummus Global, to produce feeds suitable for use in a steam pyrolysis reactor. Instead of hydroprocessing, one may also consider other routes, such as delayed coking and/or fluid catalytic cracking (FCC). Additionally, heat energy available in this stream may be used to preheat other process streams or to generate steam.

The radiant coil technology can be any type with bulk residence times ranging from 90 milliseconds to 1000 milliseconds with multiple rows and multiple parallel passes and/or split coil arrangements. They can be vertical or horizontal. The coil material can be high strength alloys with bare and finned or internally heat transfer improved tubes. The heater can consist of one radiant box with multiple coils and/or two radiant boxes with multiple coils in each box. The radiant coil geometry and dimensions and the number of coils in each box can be the same or different. If cost is not a factor, multiple stream heaters/exchangers can be employed.

Following cracking in the radiant coils, one or more transfer line exchangers may be used to cool the products very quickly and generate (super) high pressure steam. One or more coils may be combined and connected to each exchanger. The exchanger(s) can be double pipe or multiple shell and tube exchanger.

Instead of indirect cooling, direct quenching can also be used. For such cases, oil may be injected at the outlet of the radiant coil. Following the oil quench, a water quench can also be used. Instead of oil quench, an all water quench is also acceptable. After quenching, the products are sent to a recovery section.

The FIGURE illustrates a simplified process flow diagram of a cracking system according to embodiments herein. A fired tubular furnace 1 is used for cracking hydrocarbons to ethylene and other olefinic and aromatic compounds. The fired tubular furnace 1 has a convection section or zone 2 and a cracking section or zone 3. The furnace 1 contains one or more process tubes 4 (radiant coils) through which a portion of the hydrocarbons initially fed through hydrocarbon feed line 22 are cracked to produce product gases upon the application of heat. Radiant and convective heat is supplied by combustion of a heating medium introduced to the cracking section 3 of the furnace 1 through heating medium inlets 8, such as hearth burners, floor burners, or wall burners, and exiting through an exhaust 10.

The hydrocarbon feedstock, such as a whole crude or a hydrocarbon mixture including hydrocarbons boiling from naphtha range hydrocarbons to hydrocarbons having a normal boiling point temperature greater than 450° C., may be introduced to a heating coil 24 through inlet 22, disposed in the convective section 2 of the steam pyrolysis heater 1. For example, hydrocarbons having a wide boiling range, including hydrocarbons having normal boiling temperatures greater than 475° C., greater than 500° C., greater than 525° C., or greater than 550° C., may be introduced to heating coil 24. In the heating coil 24, the hydrocarbon feedstock may be pre-heated, such as to a temperature less than a bubble point of the hydrocarbon feedstock. The heated hydrocarbon feedstock 26 is then contacted with steam 50 at a low relative velocity and the fed to a separator 27 for separation into a vapor fraction 28 and a liquid fraction 30. While not explicitly illustrated, the embodiment as illustrated in the FIGURE contemplates co-current contact of the steam 50 and pre-heated hydrocarbon 26 prior to feed to a cyclonic separator 27.

Steam may be supplied to the process via flow line 32. Various portions of the process may use low temperature or saturated steam, while others may use high temperature superheated steam. Steam to be superheated may be fed via flow line 32 into heating coil 34, heated in the convection zone 2 of the steam pyrolysis heater 1, and recovered via flow line 36 as superheated steam. Steam 50 may be supplied from flow line 32, or alternatively may be superheated steam from flow line 50A.

The contacting of the steam 50 or 50A at low relative velocity with the pre-heated hydrocarbon feedstock 26 may volatilize, for example, the lightest 10 to 30 wt % of the hydrocarbon components, which may be recovered along with the steam in flow line 28. A portion of the steam may be fed via flow line 40 and mixed with vapor fraction 28 to form a steam/hydrocarbon mixture in line 42. The steam/hydrocarbon mixture in stream 42 may then be fed to a heating coil 44 through system (A). The resulting superheated mixture may then be fed via flow line 46, through system (B) to a cracking coil 4 disposed in a radiant zone 3 of the steam pyrolysis heater 1. The cracked hydrocarbon product may then be recovered via flow line 12 for heat recovery, quenching, and product recovery. Systems (A) and (B) may be a simple conduit, or may include one or more heaters, additional steam injection, secondary hydrocarbon feeds, or intermediate processing. For example, instead of additional steam being fed via flow line 40 and mixing with vapor fraction 28, the steam may be mixed in system (A).

The liquid fraction 30, being the heaviest 70 to 90 wt % of the hydrocarbon feedstock which was not volatilized in heating coil 24, may then be fed to a system (C) for conditioning the heavier components for thermal cracking. Following conditioning in system (C), the resulting hydrocarbons to be thermally cracked may be preheated in coil 52, be mixed with steam 53 prior to or following heating coil 52 disposed in the convective zone 2 of steam pyrolysis reactor 1. In heating coil 52, the conditioned hydrocarbons may be partially or wholly vaporized. As noted above, in some embodiments, a small amount of steam (not shown) may be added prior to heating of the heavy feed. The injection of steam into the conditioned liquid fraction 30 may help prevent formation of coke in heating coil 52. The heated liquid fraction 54 may optionally be fed to a separator 56 for separation into a vapor fraction 58 and a liquid fraction 60. Stream (C) may be thermally cracked in the same steam cracker, as shown. In other embodiments, stream (C) may be thermally cracked in a different heater, providing additional temperature control. Alternatively, stream (C) may be processed in a hydroprocessing unit or in a FCC unit. In other embodiments, stream (C) may be blended with other streams to form a fuel.

A portion of the superheated steam may be fed via flow line 62 and mixed with vapor fraction 58 to form a steam/hydrocarbon mixture in line 64. The steam/hydrocarbon mixture in stream 64 may then be fed to a heating coil 66. The resulting superheated mixture may then be fed via flow line 68 to a cracking coil 4 disposed in a radiant zone 3 of the steam pyrolysis heater 1. The cracked hydrocarbon product may then be recovered via flow line 13 for heat recovery, quenching, and product recovery.

Superheated steam can be injected via flow line 74 directly into separator 56. The injection of superheated steam into the separators may reduce the partial pressure and increase the amount of hydrocarbons in the vapor fraction 58.

In addition to heating the hydrocarbon and steam streams, the convection zone 2 may be used to heat other process streams and steam streams, such as via coils 80, 82, 84. For example, coils 80, 82, 84 may be used to heat BFW (Boiler feed water) and preheating SHP (super high pressure) steam, among others.

The placement and number of coils 24, 52, 34, 44, 66, 80, 82, 84 can vary depending upon the design and the expected feedstocks available. In this manner, convection section may be designed to maximize energy recovery from the flue gas. In some embodiments, it may be desired to dispose superheating coil 44 at a higher flue gas temperature location than superheating coil 66. Cracking of the lighter hydrocarbons may be carried out at higher severity, and by locating the superheating coils appropriately, cracking conditions may be enhanced or tailored to the specific vapor cut.

As described above, separator 27 may be configured to contact the preheated hydrocarbon feedstock in a co-current or countercurrent manner at a low relative velocity. The contacting may achieve a low lift (such as volatilization of less than 30 wt % of the hydrocarbons), and may also result in a high average hydrocarbon droplet diameter (such as above 25 microns).

Separator 56 may be operated to achieve a high degree of volatilization. As desiring a high degree of volatilization, second separator 56 may be a heavy oil processing system (HOPS) tower, which may be used to achieve greater than 95% volatilization of the conditioned hydrocarbons. Alternatively, one may use a separator similar to separator 27 to achieve a high degree of volatilization. Additionally, while the FIGURE shows both light and high boiling streams being thermally cracked in a single heater or multiple heaters, the high boiling fraction may alternatively be processed in a hydroprocessing unit, as noted above.

In each of the above-described embodiments, liquid hydrocarbon feeds may be preheated and mixed with steam. Embodiments herein are further directed toward forming a mixture of steam and liquid hydrocarbons, where the liquid hydrocarbons are heated without forming significant vapor, and thus avoiding high velocity. Dilution steam is then added to the hydrocarbon at low velocity to vaporize the more volatile hydrocarbons, without creating small, difficult to separate, liquid droplets.

For example, embodiments herein may include preheating crude oil or other hydrocarbon fractions in a steam cracker's convection section to a temperature below its bubble point temperature. The preheated crude may then be contacted in a vertical vessel, containing mass and/or heat transfer internals, to contact the steam and crude at low velocities. In some embodiments, the steam and crude may flow counter-currently. Velocities in the vertical vessel may be kept low enough to minimize or prevent formation of small liquid droplets having diameters less than 25 microns. The vapor from the overhead of the vessel, including steam and volatilized hydrocarbons, may then be directed to superheating and/or the radiant section of the steam cracker for conversion to olefins. The vertical vessel and contacting internals may allow for the contacting of the liquid hydrocarbon fraction with steam to vaporize a fraction of said hydrocarbon feedstock at low velocities to avoid formation of small droplets. The droplet-free or essentially droplet-free vapor fraction may then be cracked in a steam cracker radiant zone.

Embodiments herein may thus provide for flexibly processing whole crudes and other hydrocarbon mixtures containing high boiling coke precursors. Advantageously, systems and processes herein may provide for the controlled volatilization of wide boiling range mixtures. Embodiments herein may advantageously reduce coking and fouling during the pre-heating, superheating, and the cracking process, even at high severity conditions. Embodiments herein may attain desirable yields, while significantly decreasing the capital and energy requirements associated with pre-fractionation and separate processing of the fractions in multiple heaters.

Suppression of coking throughout the cracking process according to embodiments herein while increasing olefin yield provides significant advantages, including increased run lengths (decreased down time) and the ability to handle feeds containing heavy hydrocarbons. Further, significant energy efficiencies may be gained over conventional processes including distillative separations and separate cracking reactors.

While the disclosure includes a limited number of embodiments, those skilled in the art, having benefit of this disclosure, will appreciate that other embodiments may be devised which do not depart from the scope of the present disclosure.

What is claimed:

1. A process for steam cracking a whole crude or a portion thereof to produce olefins and/or aromatics, the process comprising:
    contacting a whole crude with steam to volatilize a portion of the whole crude, wherein the contacting of the whole crude and steam forms hydrocarbon droplets having a D10 of greater than about 30 microns;
    recovering a vapor phase comprising volatilized hydrocarbons and steam and a liquid phase comprising unvaporized hydrocarbons;
    feeding the vapor phase to a steam pyrolysis reactor to convert at least a portion of the hydrocarbons therein to olefins and/or aromatics.

2. The process of claim 1, wherein the contacting of the whole crude with steam forms hydrocarbon droplets having a D10 of greater than about 85 microns.

3. The process of claim 1, wherein the contacting of the whole crude with steam forms hydrocarbon droplets having a D10 of greater than about 200 microns.

4. The process of claim 1, further comprising passing the whole crude through a convection section of the steam pyrolysis reactor for preheating prior to the contacting step.

5. The process of claim 4, wherein the preheating comprises heating the whole crude to a temperature below its bubble point temperature.

6. The process of claim 1, wherein the contacting comprises mixing the steam and the whole crude in co-current flow, and the recovering comprises separating the vapor phase from the liquid phase in a cyclonic separator.

7. The process of claim 1, wherein the whole crude and steam are contacted counter-currently.

8. The process of claim 1, further comprising controlling a steam temperature and steam feed rate sufficient to volatilize 5 to 90 weight percent of the hydrocarbons in the whole crude.

9. The process of claim 1, further comprising controlling a steam temperature and steam feed rate sufficient to volatilize 10 to 30 weight percent of the hydrocarbons in the whole crude.

10. The process of claim 1, further comprising controlling a steam temperature and steam flow rate to recover in the vapor fraction 70 to 98 weight percent of hydrocarbons in the whole crude having a normal boiling point of 160° C. or less.

* * * * *